(12) United States Patent
Casey et al.

(10) Patent No.: US 8,082,807 B2
(45) Date of Patent: Dec. 27, 2011

(54) SENSOR ASSEMBLY AND METHOD

(75) Inventors: Gary Casey, Thousand Oaks, CA (US); Nhan Nguyen, Simi Valley, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 868 days.

(21) Appl. No.: 12/131,879

(22) Filed: Jun. 2, 2008

(65) Prior Publication Data

US 2009/0293584 A1   Dec. 3, 2009

(51) Int. Cl.
*G01L 27/00* (2006.01)

(52) U.S. Cl. .................. 73/862.581; 73/1.63; 73/718

(58) Field of Classification Search ............ 73/1.63, 73/714, 718, 862.581
See application file for complete search history.

(56) References Cited

U.S. PATENT DOCUMENTS

| | | | | |
|---|---|---|---|---|
| 5,445,031 | A | * | 8/1995 | Benzel .......................... 73/724 |
| 6,675,656 | B1 | * | 1/2004 | Plochinger ..................... 73/718 |
| 7,246,526 | B2 | * | 7/2007 | Won et al. ..................... 73/754 |
| 7,270,011 | B2 | * | 9/2007 | Vossenberg .................... 73/754 |
| 7,515,039 | B2 | * | 4/2009 | Casey et al. .................. 340/442 |
| 7,854,171 | B2 | * | 12/2010 | Silverbrook et al. .......... 73/724 |
| 2008/0149446 | A1 | * | 6/2008 | Schuurman ................. 192/3.58 |

* cited by examiner

*Primary Examiner* — Freddie Kirkland, III
(74) *Attorney, Agent, or Firm* — Gilman Clark & Hunter LLC; Shane Hunter

(57) ABSTRACT

Described herein is the sensor assembly and method for rapidly obtaining accurate readings of a variable. The sensor assembly comprises a plurality of sensors which are connected to a microcontroller that processes the signals of the individual transducers to the microcontroller. The microcontroller contains software that maximizes the refresh rate and/or minimizes the time it takes to process the outputs of each of the transducers. The microcontroller that is coupled to the sensor assembly selectively measures the outputs of each transducer so as to speed up the refresh rate of the sensor.

12 Claims, 3 Drawing Sheets

SENSOR ASSEMBLY AND METHOD

FIELD OF THE INVENTION

The present invention relates generally to sensor assemblies and methods for manipulating their output.

BACKGROUND OF THE INVENTION

Sensor assemblies are well known in the art. In order to maintain maximum operation, the readings of each of the sensors must be obtained as quickly as possible. It is known in the prior art to consecutively read the output of numerous analog sensors by converting the outputs of each of the sensors using an analog to digital convertor and then processing the signals.

SUMMARY OF THE PREFERRED EMBODIMENT AND METHOD

In a preferred embodiment of the present invention, a sensor assembly comprising a plurality of sensors/transducers packaged in a single housing are connected to a microcontroller that processes the signals of the individual transducers to the microcontroller. The microcontroller contains software that maximizes the refresh rate and/or minimizes the time it takes to process the outputs of each of the transducers. In the preferred embodiment, each transducer is able to create at least two outputs sharing a common output channel. At least one of the outputs represents a variable such as pressure or temperature that is applied to the transducer. The other output represents the output independent of the variable and is used to compensate for any external effects on the transducer so that the true variable can be calculated. The output of each transducer is connected to a separate input of the microcontroller which selects which of the available outputs of each transducer is read.

The microcontroller that is coupled to the sensor assembly selectively measures the outputs of each transducer so as to speed up the refresh rate of the sensor. Once the data from all of the channels has been captured, they are calibrated, if necessary, using calibration coefficients stored in memory. The information can now be sent to the control unit.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

In the following descriptions of the invention, terms such as "front," "back," "top," "bottom," "side," and the like are used herein merely for ease of description and refer to the orientation of the components as shown in the Figures.

Figure 1:
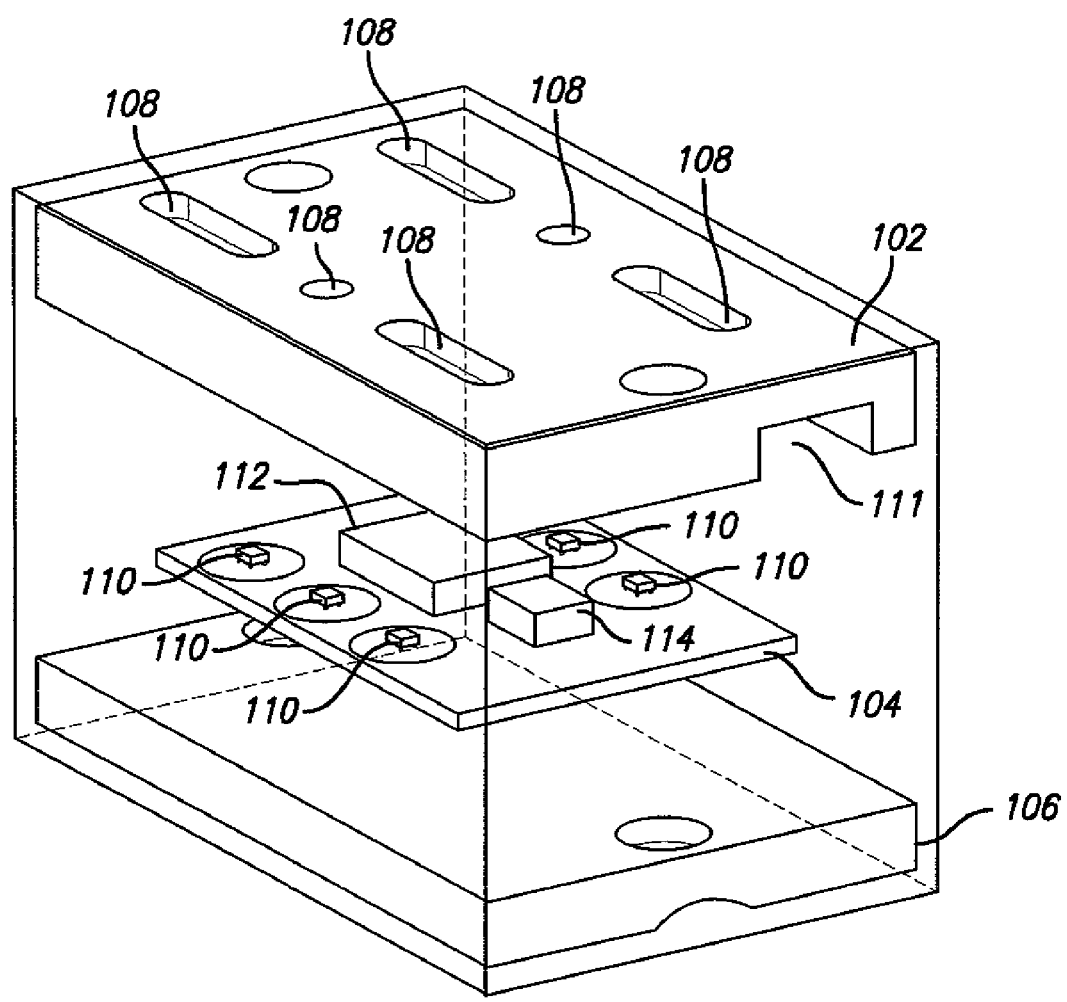
FIG. 1 is an exploded view of a preferred embodiment of the sensor assembly of the present invention.
Figure 2:
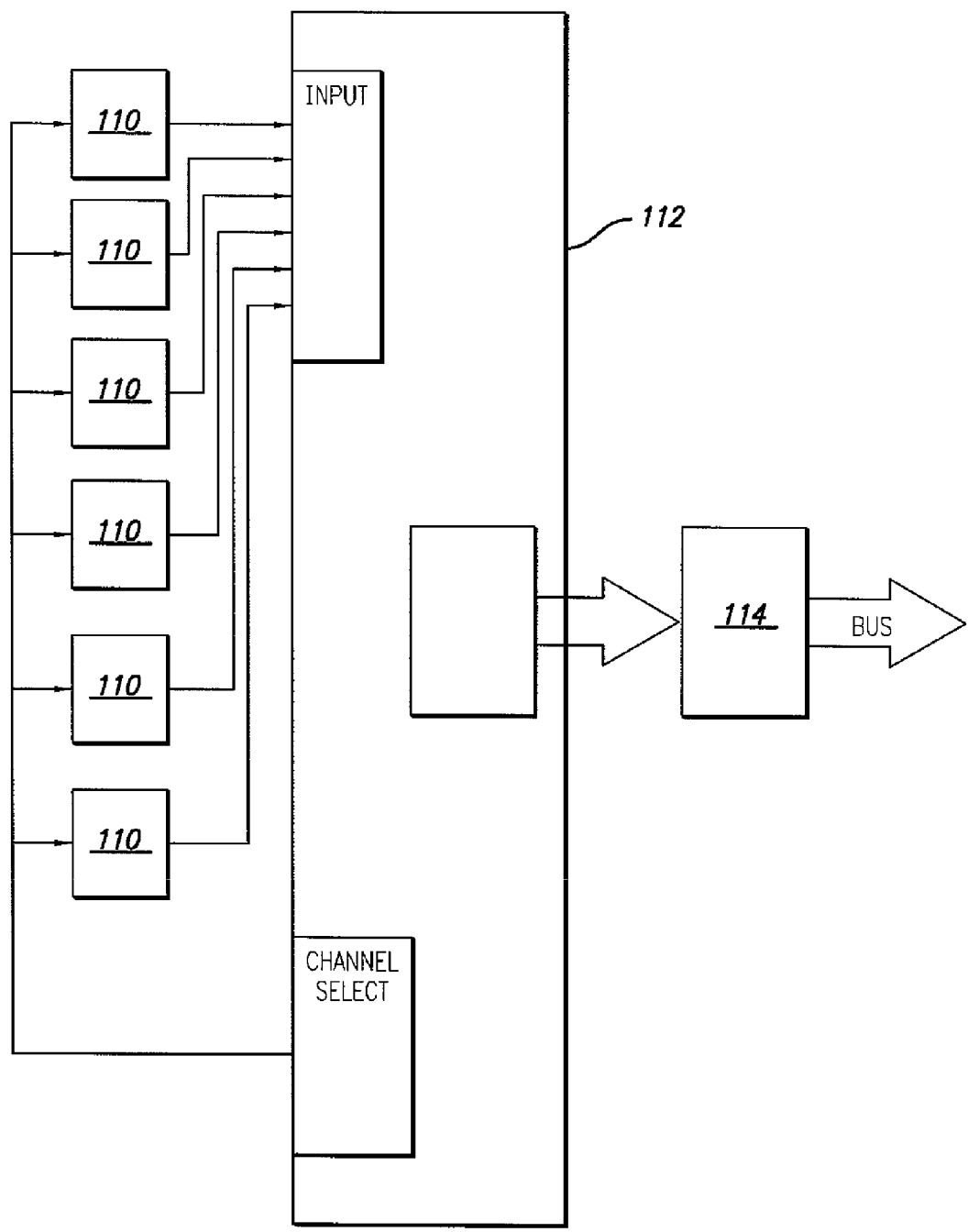
FIG. 2 is schematic block diagram of a preferred embodiment of the sensor assembly of the present invention.

Generally, the present invention may be briefly described as follows. Referring first to FIGS. 1 and 2, a preferred embodiment of a sensor assembly 100 of the present invention is shown.

The capacitive sensor element assembly 100 comprises a top layer 102 a middle layer 104 and a bottom layer 106. The top layer 102 is preferably comprised of aluminum but be comprised of any material that is non-porous and dimensionally stable. The top layer 102 has ports 108 corresponding to each of the sensors/transducers 110 on middle layer 104. In a preferred embodiment in which the sensor assembly is used in an automobile, the ports are whatever shapes that are necessary to fit the transmission ports.

In a preferred embodiment in which there are 6 sensors 110, there will be 6 corresponding ports 108 thereabove. Also in a preferred embodiment, top layer 102 contains a lead wire exit 111 through which the lead wires (not shown) attached to the middle plate 104 are coupled to an Electronic Control Unit (not shown).

In a preferred embodiment, the bottom layer 106 or backing plate is comprised of steel or aluminum or any material that is flat and rigid enough so that it doesn't deflect under pressure.

In a preferred embodiment, the middle layer 104 is preferably comprised of aluminum oxide and glass but can be any material that is insulating and has a low thermal coefficient of expansion. In a preferred embodiment, the middle layer 104 has 6 transducers 110, a microcontroller 112 and a transceiver 114 thereon. However, the precise number of transducers that are used is dependent upon the application for which the sensor assembly will be used and can be more or less than 6. Likewise, although a preferred embodiment contains a microcontroller on the same layer as the transducers, in another embodiment, the microcontroller can be located on another layer or not part of the assembly at all. Likewise, while in a preferred embodiment a CAN transceiver can be used, although the CAN protocol imposes unnecessary limits on the length of the data stream. Thus, a different type of transceiver can be used that either does not impose limits on the length of the data stream or imposes different limits.

In a preferred embodiment, the transducers 110 are sCap3 sensors having two capacitors—one that measures pressure $C_p$ and another that measures the reference characteristics $C_r$, independent of the variable being measured. However, another type of sensor having a digital output that measures a reference characteristic and at least one or more variable characteristics can be used.

In order to obtain a more accurate reading of the variable detected by each sensor, the output from the reference capacitor $C_r$ is used to compensate for other effects such as from the environment (such as temperature) affecting the variable capacitor $C_p$. By measuring these two outputs, a variable such as pressure can be calculated. The output of the reference capacitor is subtracted from the output of the pressure capacitor $C_p$ ($C_p - C_r$) and the net result is the pressure.

Figure 3:
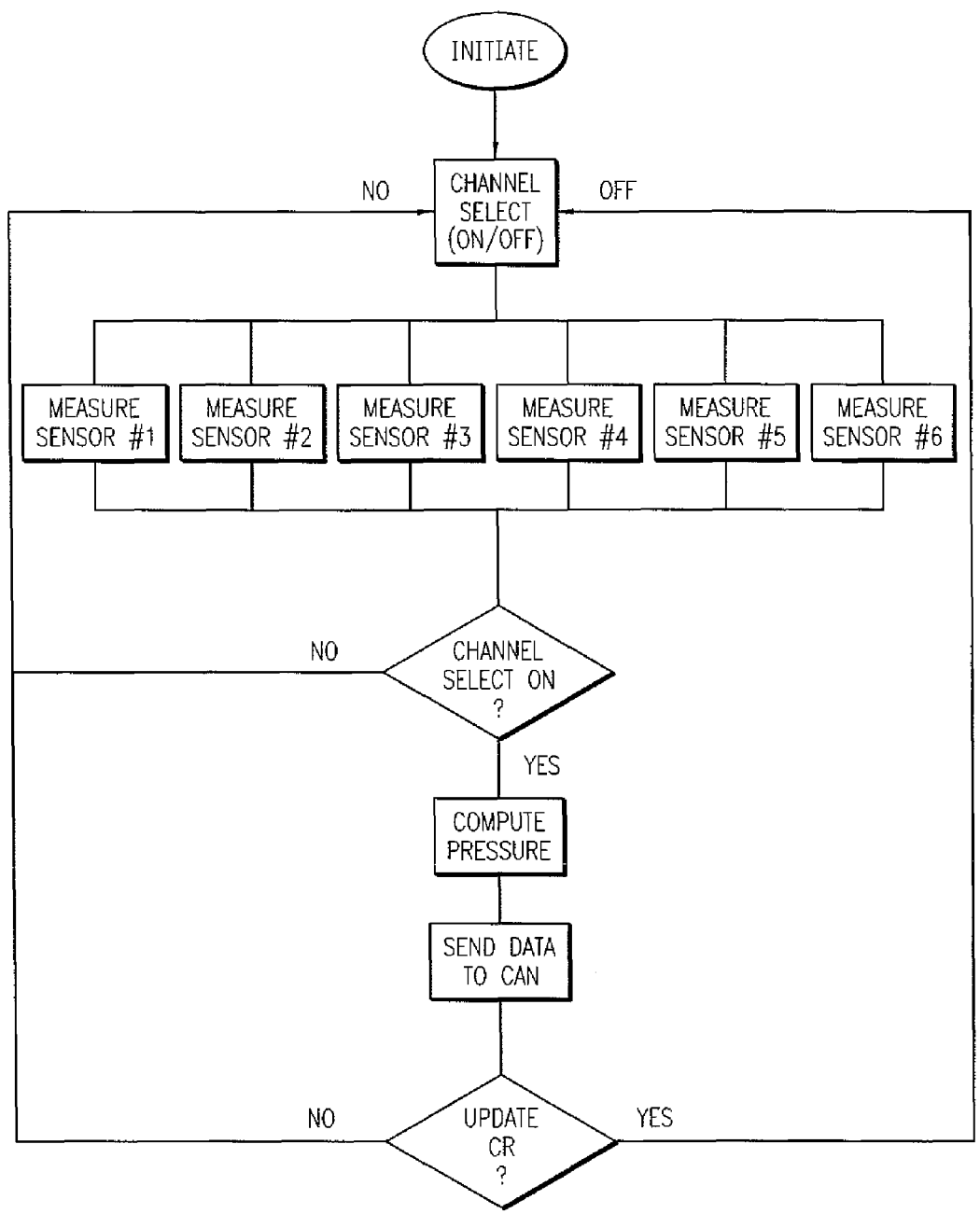
FIG. 3 is a flow chart of a preferred method of the present invention.

Referring to FIGS. 2 and 3, a preferred method of the present invention is shown. As shown in FIG. 2, the output pulse width of each transducer 110 is connected to a separate digital input 120 in the microcontroller 112, and is toggled between the $C_p$ and $C_r$ by a digital signal applied to the channel select pins (not shown) on each of the transducers 110.

The pulse widths are measured at the digital inputs by setting up interrupts for each channel that detect the rising edge of the incoming pulse train. The interrupt function measures the time it takes for N pulses to come in and divides that time by N to obtain am average pulse width. When each channel has received N pulses, the main program switches the Channel Select pin and the interrupt functions repeat the procedure to capture the average reference pulse widths $C_r$. However, since it is not necessary to measure $C_r$ every time that $C_p$ is measured since the effect of temperature on $C_p$ change slower than the effect of pressure which changes more rapidly, it is not necessary to take the measurement of $C_r$ as often as it is necessary to take the measurement of $C_p$ in order to obtain an accurate pressure reading. Thus, $C_r$ is measured only after $C_p$ has been measured a predetermined number of times, which, in effect, greatly increases the refresh rate and accuracy of the pressure reading of each sensor.

Specifically, referring to FIGS. 2 and 3, in a preferred method of the present invention, since measuring the pulse widths and calculating the averages of the output of each sensor is handled by the interrupt functions that work autonomously and simultaneously, the main program (microcontroller) is not burdened by calculating the averages or waiting in loops for the signals to come in. This greatly reduced the processing time and the overall response time and refresh rate of the sensor.

Once the data from all channels has been captured, the main function calculates the pressures using calibration coefficients for each transducer that have been previously stored in the microcontroller memory. The final output is then sent to the transceiver 114 which determines if the reference output needs to be updated. When a CAN transceiver is used, the output is sent in two separate packets or data, one for sensors 1, 2 and 3 and a second packet for sensors 4, 5 and 6 due to the limitations on the data stream length that is imposed by the CAN protocol. However, as other protocols are developed, the output can be sent in more or less packets or even directly to the ECU, depending on the output desired.

Using the sensor assembly of the present invention, all of the outputs of the various sensors can be read at once and the output of each sensor can be manipulated for a more accurate reading.

For example, when the assembly of the present invention is used in an automobile, each clutch can be attached to a different sensor via the ECU. The ECU would then determine which sensor it wanted to read so that under certain driving conditions, some sensors will be read more than others whereby the assembly will give a faster response creating a smoother shift change in the transmission.

Those skilled in the art will understand that this type of sensor can be used in the automotive, airplane, heating, ventilating, and air conditioning systems (HVAC) industries, among other applications.

The embodiments and methods described above are exemplary embodiments and methods of the present invention. Those skilled in the art may now make numerous uses of, and departures from, the above-described embodiments and methods without departing from the inventive concepts disclosed herein. Thus, the construction of the embodiments and the steps of the methods disclosed herein are not limitations of the invention. Accordingly, the present invention is to be defined solely by the scope of the following claims.

What is claimed is:

1. A sensor assembly for detecting a required variable, comprising:
   a plurality of sensors with digital outputs, each of the plurality of sensors configured to detect an output responsive to a required variable and to detect a reference output representative of a reference characteristic independent of the required variable to compensate for an effect of the reference characteristic on the detected output responsive to the required variable, and
   a microcontroller coupled to the output of each sensor, to control whether the reference output or the output responsive to the required variable of at least a selected one of the plurality of sensors is detected and when.

2. The sensor assembly of claim 1, wherein the reference output is used to compensate for one or more environmental effects on the output responsive to the required variable in order to accurately determine the value of the variable.

3. The sensor assembly of claim 1 further comprising an interrupt configured to detect the rising edge of each incoming pulse train representing the output responsive to the required variable of each sensor and further configured to measure the time it takes for a preselected number of incoming pulse trains to be detected and thereafter dividing that time by the preselected number to obtain an average pulse width for the output responsive to the required variable for each sensor, and after a predetermined number of averages has been obtained to repeat the procedure to capture the average reference pulse width for each sensor, and thereafter to repeat the process.

4. The sensor assembly of claim 1 further comprising a first layer having ports therein for exposing the plurality of sensors to the required variable.

5. The sensor assembly of claim 1 further comprising a layer on which the plurality of sensors and the microcontroller is located.

6. The sensor assembly of claim 5 further comprising a top layer having ports therein for exposing the plurality of sensors to the variable and a bottom rigid layer with low thermal expansion on which the sensor layer is mounted.

7. A pressure sensor assembly, comprising:
   a plurality of pressure sensors, each capable of detecting a pulse responsive to pressure and a reference pulse representative of one or more environmental effects independent of the pressure; and
   a microcontroller configured to measure the two pulses detected by each of the plurality of pressure sensors, such that the reference pulse of a particular sensor is used to compensate for the environmental effects on the pressure pulse detected by that same sensor to determine the pressure on a particular sensor;
   wherein the microcontroller is configured to determine which pulses of which sensors are measured.

8. The pressure sensor assembly of claim 7, further comprising an interrupt configured to detect the rising edge of each incoming pulse train representing the pressure output of each sensor and further configured to measure the time it takes for a preselected number of incoming pulse trains to be detected and thereafter to divide that time by the preselected number to obtain an average pulse width for the pressure output for each sensor, and after a predetermined number of averages has been obtained for the pressure output of a sensor to repeat the procedure to capture the average reference pulse width for that sensor, and thereafter to repeat the process.

9. A method for detecting pressure in an automatic transmission having a plurality of clutches and an engine control unit (ECU), the method comprising:
   coupling each of the plurality of clutches to a respective sensor of a plurality of sensors located within a pressure assembly comprising the plurality of sensors;
   detecting the pressure of each clutch as needed by detecting the pressure on a corresponding sensor a selected number of times and thereafter using a reference output detected by that sensor, the reference output representative of one or more environmental effects independent of the pressure, to compensate for the environmental effects of the detected pressure on that sensor so that a true pressure may be obtained.

10. The method of claim 9, wherein detecting the pressure of each clutch is performed by a microcontroller.

11. The method of claim 9, wherein detecting the pressure of each clutch is performed by the ECU.

12. The method of claim 9, further comprising:
   calibrating the measurements of the pressure for each of the plurality of clutches using calibration coefficients for each sensor, and
   determining if the reference output needs to be updated.

* * * * *